United States Patent [19]

Sakai et al.

[11] 4,105,716
[45] Aug. 8, 1978

[54] PROCESS FOR PRODUCING TETRAFLUOROETHYLENE/HEXA-FLUOROPROPYLENE COPOLYMER BLENDS

[75] Inventors: Shoji Sakai, Settsu; Masahiro Okuda, Amagasaki, both of Japan

[73] Assignee: Daikin Kogyo Co., Ltd., Osaka, Japan

[21] Appl. No.: 767,967

[22] Filed: Feb. 11, 1977

[30] Foreign Application Priority Data

Feb. 17, 1976 [JP] Japan .................................. 51-16639

[51] Int. Cl.² ........................................... C08F 214/26
[52] U.S. Cl. .................................. 260/884; 260/900; 526/254
[58] Field of Search .................. 526/254, 87; 260/884, 260/900

[56] References Cited

U.S. PATENT DOCUMENTS

| | | | |
|---|---|---|---|
| B 564,902 | 3/1976 | Roura | 260/900 |
| 2,549,935 | 4/1951 | Sauer | 526/254 |
| 2,598,283 | 5/1952 | Miller | 526/254 |
| 2,938,889 | 5/1960 | Krespan | 526/254 |
| 2,946,763 | 7/1960 | Bro et al. | 526/254 |
| 3,864,322 | 2/1975 | Yallourakis | 526/254 |
| 3,969,435 | 7/1976 | Bailey et al. | 260/900 |

*Primary Examiner*—Harry Wong, Jr.
*Attorney, Agent, or Firm*—Stevens, Davis, Miller & Mosher

[57] ABSTRACT

A process for producing tetrafluoroethylene/hexafluoropropylene copolymer having a hexafluoropropylene content of 8 to 20% by weight and having an excellent stress-cracking resistance and also excellent heat resistance, molding properties, chemical resistance and electrical characteristics, which comprises polymerizing tetrafluoroethylene monomer and hexafluoropropylene monomer in the presence of a polymerization initiator, wherein the tetrafluoroethylene monomer is used in a large amount at the first stage of the polymerization reaction and thereafter the polymerization reaction is continued in a smaller amount of the tetrafluoroethylene monomer.

6 Claims, No Drawings

PROCESS FOR PRODUCING TETRAFLUOROETHYLENE/HEXAFLUOROPROPYLENE COPOLYMER BLENDS

The present invention relates to a process for producing a tetrafluoroethylene/hexafluoropropylene copolymer, particularly having an excellent stress-cracking resistance.

The copolymer of tetrafluoroethylene (hereinafter, referred to as "TFE") and hexafluoropropylene (hereinafter, referred to as "HFP") has excellent heat resistance, chemical resistance, electrical characteristics, etc. comparative with those of polytetrafluoroethylene (hereinafter, referred to as "PTFE") and has further excellent melt-flow characteristics which are not shown by PTFE, and can be readily processed by the conventional melt processing methods, such as compression molding, extrusion molding, injection molding, fluidization dip coating, or the like. The processed products can widely be used for various purposes.

The TFE/HFP copolymer to be melt-processed should have a specific melting viscosity (as defined hereinafter) of not higher than about $10^6$ poise, preferably not higher than $3 \times 10^5$ poise from the standpoint of the processability thereof but on the other hand, of not lower than $10^4$ poise from the standpoint of the mechanical strength which is required for the practical use thereof.

The TFE/HFP copolymer having the desired range of the specific melting viscosity and a sufficient mechanical strength has a HFP content of not lower than about 8% by weight, preferably not lower than 10% by weight on the basis of the whole weight of the copolymer. However, the TFE/HFP copolymer having a specific melting viscosity of lower than about $10^5$ poise shows an inferior stress cracking resistance, that is, when the molded product of the TFE/HFP copolymer has an internal distortion, it is easily cracked by being heated at 180° C or higher or contacting with an organic solvent under a stress, and hence, the utility thereof is restricted.

The improvement of the stress-cracking in some crystalline polymers, such as polyethylene and polystyrene has been developped, and it is usually achieved by blending or graft-polymerizing the polymer with an elastomer. However, in case of the TFE/HFP copolymer, such a method is not suitably applicable, because the copolymer is usually molded at a high temperature such as 300° to 420° C and the molded product is occasionally used at a temperature of 200° C or higher, by which the product is colored owing to the heat degradation of the blended or graft-polymerized elastomer and the heat resistance of the product is deteriorated.

As the results of the present inventor's study, it has been found that the stress-cracking resistance of the TFE/HFP copolymer can be improved by increasing the HFP content (as defined hereinafter) and the molecular weight thereof. That is, when the TFE/HFP copolymer has the HFP content of 8% by weight or more on the basis of the whole weight of the copolymer, the copolymer has sufficient sheet forming properties, and the stress-cracking resistance thereof increases with the increase of the HFP content. But on the other hand, the increase of the HFP content induces unfavorably the lowering of the melting point and heat resistance of the copolymer and also the lowering of the rate of polymerization. Besides, the increase of the molecular weight of the copolymer is effective for the increase of the specific melting viscosity and also the improvement of the stress-cracking resistance, but on the other hand, it results in the remarkable lowering of the moldabilities thereof.

The present inventors have intensively studied to find a method for improving the stress-cracking resistance of the TFE/HFP copolymer without deteriorating the excellent properties thereof, such as the excellent heat resistance, molding properties, chemical resistance, electrical characteristics, or the like, and have found that the stress-cracking resistance of the TFE/HFP copolymer can be improved when the polymerization reaction is carried out in a large amount of the TFE monomer (whereby the reaction rate is increased) at the first stage and thereafter is continued in a smaller amount of the TFE monomer.

An object of the present invention is to provide a process for producing a TFE/HFP copolymer having an excellent stress-cracking resistance and also excellent heat resistance, molding properties, chemical resistance and electrical characteristics.

Another object of the invention is to provide a method for improving the stress-cracking resistance of the TFE/HFP copolymer without deteriorating other excellent properties thereof.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Although there is not sufficiently made clear the true reason for the improvement of stress-cracking resistance, it is assumed that the polymer having a wider molecular weight distribution shows an inferior stress-cracking resistance to the polymer having a narrower molecular weight distribution and particularly the low molecular weight component has a bad influence, on the basis of the facts that a blend of a TFE/HFP copolymer having a high specific melting viscosity and a TFE/HFP copolymer having a low specific melting viscosity shows a markedly inferior stress-cracking resistance in comparison with blends of other polymers even if the specific melting viscosity and the HFP content are the same; and further that the copolymer produced by copolymerizing the monomers in the presence of a molecular weight regulator shows a more excellent stress-cracking resistance in comparison with the copolymer produced by copolymerizing the monomers without using a molecular weight regulator.

According to the conventional polymerization process, TFE and HFP are copolymerized at a markedly lower rate of polymerization at the first stage and hence it tends to produce a product having a larger content of a low molecular weight component. On the contrary, according to the present invention, the amount of the TFE monomer in the polymerization system is increased at the first stage of the reaction and thereby the rate of polymerization is increased, and hence the production of the low molecular weight component is inhibited, and thereafter, the reaction is continued in a smaller amount of the TFE monomer. As the result, the copolymer of the present invention contains little low molecular weight component and has a narrower molecular weight distribution in comparison with the copolymer produced by the conventional polymerization process even though the specific melting viscosity and the HFP content thereof are almost the same, by which, it is assumed, the stress-cracking resistance of the copolymer is improved.

The TFE/HFP copolymer of the present invention comprises essentially two monomers: TFE and HFP, contrary to the conventional products wherein an elastomer is blended or graft-copolymerized in order to improve the stress-cracking resistance thereof. According to the present invention, the component of the TFE/HFP copolymer having a large TFE content and a small HFP content is produced in the first stage of the polymerization, which is not necessarily desirable, but the amount is very small, and hence, the peculiar chemical and physical properties which the copolymer has originally is not deteriorated. Accordingly, the present TFE/HFP copolymer can be processed by various melt processing methods, such as compression molding, extrusion molding, injection molding, fluidization dip coating, or the like, and is stable at a wide range of a temperature from a high temperature to an extremely low temperature with or without contacting with oxidizing agents, reducing agents, solvents, chemicals, or the like, and the product is suitable for producing various molded products useful in electrical, mechanical and chemical fields, for instance, pipes which are used at a high temperature or with contacting with an organic solvent.

In the process of the present invention, the amount of the TFE monomer in the polymerization system is kept large for a period of time during which at least 15% by weight, preferable at least 20% by weight, on the basis of the whole weight of the copolymer finally produced can be formed. This period of time to be kept in the large amount of the TFE monomer is about 1/10 or shorter of the whole polymerization reaction time.

Under taking into consideration the fact that the desired TFE/HFP copolymer should have the HFP content of not less than 8% by weight, preferably not less than 10% by weight, on the basis of the whole weight of the copolymer, the amount of the TFE monomer at this first stage of the reaction should be controlled so that the copolymer produced during this first stage has the HFP content of not more than 10% by weight, preferably 2 to 10% by weight, on the basis of the weight of the copolymer.

Besides, it is well known that the melting point of the TFE/HFP copolymer has a direct relation with the monomer content thereof and the copolymer having 2 to 10% by weight of HFP content which is produced at the first stage of the reaction has a melting point of about 280° to 310° C, and the copolymer produced at the later stage of the reaction has a lower melting point. Thus, the copolymer of the present invention has specific double components, which is confirmed by measuring the endotherm of the copolymers at each melting point thereof with a differential calorimeter.

In addition to the above conditions, in the process fo the present invention, it is required to control so that the HFP content of the copolymer produced at the first stage of the polymerization reaction is at least 2% by weight lower than the HFP content of the copolymer produced at the later stage, in other words, there is a gap of at least 2% by weight between the HFP contents of the copolymers produced at the first stage and at the later stage. When this gap is less than 2% by weight, there can not be obtained the desired copolymer having an excellent stress-cracking resistance. Accordingly, the reaction conditions at the later stage should be controlled so as to satisfy the above requirement and also so that the HFP content of the copolymer finally produced becomes 8 to 20% by weight.

Besides, as is explained hereinafter, one of the most importance factors effective on the HFP content of the copolymer is the monomer components (the amount of the HFP monomer) in the polymerization system, and hence, it is very important to control the monomer components in the polymerization system in the most suitable range.

The monomer components (i.e. the HFP content) of the copolymer successively produced during the polymerization reaction vary with various factors, such as the monomer components in the polymerization system, the polymerization temperature, the polymerization pressure, the presence of an emulsifier or the like, but the most important factor is the monomer components in the polymerization system. It is well known that the monomer components of the produced copolymer and the monomer components in the polymerization system (in the autoclave) have the relation as shown by the following equation:

$$\frac{x}{y} = \frac{x}{y} \cdot \frac{r_1 X + Y}{X + r_2 Y}$$

wherein $x$: % by mol of TFE contained in the produced copolymer, $y$: % by mol of HFP contained in the produced copolymer, $X$: % by mol of TFE monomer in the polymerization system, $Y$: % by mol of HFP monomer in the polymerization system, $r_1$: the copolymerization reactivity ratio when the addition of TFE monomer to the copolymer chain is effected, $r_2$: the copolymerization reactivity ratio when the addition of HFP monomer to the copolymer chain is effected.

The numerals $r_1$ and $r_2$ vary with the variation of the polymerization conditions and hence are experimentally determined in accordance with the adopted polymerization conditions. For instance, according to the experiments by the present inventors, in case of the suspension polymerization at a temperature of lower than 50° C, $r_1$ is 60 and $r_2$ is 0, and in case of the emulsion polymerization at a temperature of higher than 50° C, $r_1$ is 20 and $r_2$ is 0. On the basis of the data, it is calculated that the amount of the HFP monomer in the polymerization system should be controlled to about 54 to 88% by weight on the basis of the whole weight of the monomers at the first stage of the polymerization reaction, when a TFE/HFP copolymer having an HFP content of 2 to 10% by weight is obtained at the first stage by the suspension polymerization at a temperature of lower than 50° C.

The polymerization reaction of the present invention can be carried out in a similar manner as the conventional process as follows.

The polymerization may be initiated by introducing water, from which air and minerals are previously removed, into an autoclave, adding TFE and HFP monomers and further adding the polymerization initiator.

As the polymerization initiator, there is used a free radical polymerization initiator, preferably an organic radical polymerization initiator which can give a stable terminal group to the polymer, for instance, di(fluoroacyl) peroxides (as disclosed in British patent specification No. 1,316,222); di(chlorofluoroacyl) peroxides (as disclosed in U.S. Pat. No. 3,671,510); dialkyl peroxy dicarbonates such as diisopropyl peroxy dicarbonate; diacyl peroxides such as isobutyryl peroxide; peroxy esters such as t-butyl peroxy pivalate, t-butyl peroxy isobutyrate or di(t-butyl) peroxy oxalate; or the like.

As a reaction medium water may be employed, and, if necessary, a solvent in which TFE and HFP monomers are soluble can also be added in a suitable amount. A preferable solvent is, for example, trichlorotrifluoroethane or monofluorotrichloromethane.

The polymerization temperature is usually in a range of 0° to 100° C and the polymerization pressure is usually in a range of 0.5 to 30 kg/cm²G.

In the process of the present invention, the ratio of the contents of TFE and HFP monomers in the polymerization system is changed on the way of the polymerization reaction. That is, when the polymerization reaction at the first stage is finished, the ratio of TFE content in the polymerization system is decreased and the ratio of HFP content is increased. The change of the ratio of the monomers can be effected, for instance, by the following two methods. One of them comprises adding the HFP monomer to the polymerization system (i.e. the autoclave used for the polymerization reaction). Another one is applied to the case the liquid phase of the monomers is present in the polymerization system. This method comprises proceeding the polymerization reaction at a prescribed pressure at the first stage and then reducing the polymerization pressure by purging the gaseous monomer from the gaseous phase in the autoclave. In this method, the TFE monomer is present in a higher ratio in the gaseous phase than that in the liquid phase, and hence, the TFE monomer is purged in a larger amount, and as the result, the ratio of HFP monomer in the polymerization system is increased.

After the ratio of the monomers contents is changed, the polymerization reaction proceeds likewise, wherein the pressure in the polymerization vessel drops with the progress of the polymerization reaction. For the recovery of the pressure drop, only TFE monomer may be added to continue the reaction. Alternatively, TFE and HFP monomers may be added in an amount which corresponds to the consumed TFE and HFP monomers, respectively.

The polymerization period depends on the desired yield of copolymer, and usually, it may be selected from the range of about 2 to about 100 hours in total. During the polymerization the presence of oxygen should be avoided. When the desired yield of copolymer is reached, the residual monomers are recovered to leave a crude TFE/HFP copolymer in the form of fine powder or granular powder.

The present invention is illustrated by the following Examples but is not limited thereto. In the Examples, the "part" is a part by weight, and the HFP content and the specific melting viscosity are measured as follows:

(1) The HFP content (% by weight):

An infrared adsorption spectrum analysis is conducted on a film made of the copolymer (thickness: about 40 μ), and the absorbance at a wavenumber of 980 $cm^{-1}$ is measured, and then the found numeral is divided by the absorbance measured at a wavenumber of 2,350 $cm^{-1}$. The HFP content is determined by 3.2-fold of the divided numeral.

(2) The specific melting viscosity:

This is measured by using a Koka Type melting flow tester. That is, the copolymer to be measured is charged into a cylinder (inside diameter: 9.5 mm) and is kept at 380° C for 5 minutes. Thereafter, the copolymer is extruded at the same temperature through an orifice (inside diameter: 2.1 mm, length: 8 mm) under a piston load of 5 kg. The specific melting viscosity is calculated by dividing 53,150 by the extrusion rate (g/minute).

EXAMPLE 1

To a jacketed stainless steel autoclave which is equipped with an inner stirrer and can contain 3,000 parts of water are added 1,000 parts of an oxygen- and mineral-free water and the air in the vessel is sufficiently replaced by nitrogen gas, and thereto are added 180 parts of TFE and 800 parts of HFP under pressure. With keeping the temperature in the vessel at 20° C, 2.0 parts of di(ω-hydrododecafluoroheptanoyl) peroxide (polymerization initiator) are added thereto under pressure with agitation, and then the polymerization reaction is initiated, at which the pressure is 9.2 kg/cm²G. At this time, the liquid phase in the autoclave consists of about 85% by weight of HFP monomer and about 15% by weight of TFE monomer. After 20 minutes, at which the pressure lowers to 9.0 kg/cm²G, the monomers are promptly purged from the gaseous phase until the pressure becomes 7.2 kg/cm²G. At this time, the liquid phase in the autoclave consists of about 94% by weight of HFP monomer and about 6% by weight of TFE monomer. Then 16 parts of methyl alcohol (molecular weight regulator) are added thereto under pressure. Thereafter, the polymerization reaction is continued, during which the pressure is kept at 7.2 kg/cm²G by adding intermittently TFE and the temperature in the vessel is kept at 20° C. After the reaction for 20 hours, the unreacted monomer is purged to give a polymer. The product is sufficiently washed with water and dried at 120° C for 24 hours to give 158 parts of a white powdery copolymer.

The copolymer thus obtained has a specific melting viscosity of $8 \times 10^4$ poise and an HFP content of 12.1% by weight. When the melting point of the product is measured by heating the dried powder (10 mg) at a raising rate of the temperature of 10° C/minute with a differential calorimeter (made by Rigaku Denki K.K., Japan), the main endothermic peak (melting point) is observed at 268° C and a small endothermic peak is also observed at 285° C.

EXAMPLE 2

The polymerization reaction is initiated in the same manner as described in Example 1 excepting that 120 parts of TFE and 400 parts of HFP are used. After 15 minutes, 250 parts of HFP and 17 parts of methyl alcohol are added to the polymerization system under pressure, and thereafter, the reaction is continued in the same manner as described in Example 1 to give 139 parts of a copolymer having a specific melting viscosity of $7.6 \times 10^4$ poise and an HFP content of 12.2% by weight. When the copolymer is measured with a differential calorimeter, there are observed the main endothermic peak (melting point) at 268° C and also a small endothermic peak at 291° C.

EXAMPLE 3

The polymerization reaction is initiated in the same manner as described in Example 1 excepting that 240 parts of TFE is used. After 4 minutes, the monomers are purged from the gaseous phase until the pressure becomes 7.2 kg/cm$^2$G, and thereto are added 16 parts of methyl alcohol under pressure. Thereafter, the polymerization reaction is continued in the same manner as described in Example 1 to give 154 parts of a copolymer having a specific melting viscosity of $7.8 \times 10^6$ poise and an HFP content of 12.1% by weight. When the copolymer is measured with a differential calorimeter, there are observed the main endothermic peak (melting point) at 267° C and also a small endothermic peak at 298° C.

COMPARATIVE EXAMPLE 1

The polymerization reaction is carried out in the same manner as described in Example 1 excepting that 120 parts of TFE and 600 parts of HFP are used and no monomer is purged on the way of the reaction and further the pressure is kept under 7.2 kg/cm$^2$G during the whole polymerization reaction to give 131 parts of a copolymer having a specific melting viscosity of $8.5 \times 10^4$ poise and an HFP content of 12.3% by weight. When the copolymer is measured with a differential calorimeter, there is observed only the main endothermic peak (melting point) at 267° C.

COMPARATIVE EXAMPLE 2

The polymerization reaction is carried out in the same manner as described in Comparative Example 1 excepting that 10 parts of methyl alcohol are used to give 161 parts of a copolymer having a specific melting viscosity of $1.8 \times 10^5$ poise and HFP content of 12.1% by weight. When the copolymer is measured with a differential calorimeter, there is observed only the main endothermic peak (melting point) at 268° C.

COMPARATIVE EXAMPLE 3

The polymerization reaction is carried out in the same manner as described in Comparative Example 1 excepting that 100 parts of TFE and 9 parts of methyl alcohol are used to give 109 parts of a copolymer having a specific melting viscosity of $8.0 \times 10^4$ poise and an HFP content of 13.8% by weight. When the copolymer is measured with a differential calorimeter, there is observed only the main endothermic peak (melting point) at 257° C.

COMPARATIVE EXAMPLE 4

The polymerization reaction is carried out in the same manner as described in Comparative Example 1 excepting that 180 parts of TFE is used and the reaction time is 8 hours to give 189 parts of a copolymer having a specific melting viscosity of $2.8 \times 10^5$ poise and an HFP content of 10.0% by weight. When the copolymer is measured with a differential calorimeter, there is observed only the main endothermic peak (melting point) at 278° C.

COMPARATIVE EXAMPLE 5

Fifty parts of the TFE/HFP copolymer obtained in Comparative Example 2 are mixed well with 0.5 part of a powdery TFE/HFP copolymer having a specific melting viscosity of $7 \times 10^3$ poise and an HFP content of 12.2% by weight in a mortar, and the mixture is twice melt-extruded at 340° C by using an extruder (the cylinder: diameter 12 mm, length 200 mm; the die: diameter 1.8 mm, length 10 mm) to give a blended product having a specific melting viscosity of $1.6 \times 10^5$ poise and an HFP content of 12.2% by weight.

COMPARATIVE EXAMPLE 6

Fifty parts of the TFE/HFP copolymer obtained in Comparative Example 1 are mixed well with 5 parts of the TFE/HFP copolymer obtained in Comparative Example 4 in a mortar, and the mixture is melt-extruded in the same manner as described in Comparative Example 5 to give a blended product having a specific melting viscosity of $9.8 \times 10^4$ poise and an HFP content of 12.0% by weight.

TEST

The stress-cracking resistance of the copolymers and the blended products obtained in the above Examples and Comparative Examples was measured by the following method.

[EF-50]

The test sample is charged into a cylindrical mold having a cavity of 120 mm in diameter, and it is kept at 350° C for 30 minutes in an electric furnace. It is further kept at the same temperature under a pressure of 60 kg/cm$^2$G for one minute and then cooled with water under a pressure to give a sheet of a thickness of 2.3–2.4 mm. The sheet thus prepared is heated at 240° C for 20 hours in an electric furnace, and thereafter, rectangular test pieces of a size of $39 \times 13$ mm are cut out therefrom, and a notch of a length of 11 mm and a depth of 0.5 mm is provided in the longitudinal direction on the central area of the test pieces with a razor. The test pieces are set in the bent state in a holder as defined in the provision of ASTM D1693-70 and then are immersed in methyl alcohol at room temperature. There is measured the time until a half of the 20 test pieces cracks. This time thus measured is called as the value of stress-cracking resistance EF-50.

[TF-50]

In the same manner as described in the above [EF-50], test pieces are prepared and are set in a holder as defined in the provision of ASTM D1693-70 and are heated at a temperature of 200° C in an electric furnace provided with a peep hole. There is measured the time until a half of the 20 test pieces cracks. This time thus measured is called as the value of stress-cracking resistance TF-50.

The results are shown in the following Table 1.

As is made clear from the results, the copolymers obtained in Examples of the present invention are superior in the EF-50 value and TF-50 value in comparison with the copolymer obtained by the conventional polymerization process (Comparative Examples 1 and 2), which means that the copolymers of the present invention have an improved stress-cracking resistance. The copolymer having a high specific melting viscosity obtained in Comparative Example 2 shows an excellent EF-50 value but is inferior in TF-50 value in comparison with the copolymer of the present invention. In the blended product obtained in Comparative Example 6, neither ET-50 nor TF-50 is improved. The blended product obtained in Comparative Example 5 are markedly inferior in EF-50 and TF-50.

Table 1

| Example No. | Specific melting viscosity (poise) | HFP content (% by weight) | Stress-cracking resistance | |
|---|---|---|---|---|
| | | | EF-50 (hour) | TF-50 (hour) |
| Ex. 1 | $8.0 \times 10^4$ | 12.1 | More than 200 | More than 48 |
| Ex. 2 | $7.6 \times 10^4$ | 12.2 | More than 200 | 36 |
| Ex. 3 | $7.8 \times 10^4$ | 12.1 | More than 200 | 30 |
| Comp. Ex. 1 | $8.5 \times 10^4$ | 12.3 | 8 | 0.5 |
| Ex. 2 | $1.8 \times 10^5$ | 12.1 | Less than 96 | 15 |
| Ex. 3 | $8.0 \times 10^4$ | 13.8 | Less than 96 | 15 |
| Ex. 4 | $2.8 \times 10^5$ | 10.0 | 1 | 0.5 |
| Ex. 5 | $1.6 \times 10^5$ | 12.2 | Less than 0.5 | 0.1 |
| Ex. 6 | $9.8 \times 10^4$ | 12.0 | 9 | 0.7 |

What is claimed is:

1. A process for producing a tetrafluoroethylene/hexafluoropropylene copolymer having a hexafluoropropylene content of 8 to 20% by weight by polymerizing tetrafluoroethylene and hexafluoropropylene in the presence of a polymerization initiator, which comprises polymerizing the monomers with an amount of hexafluoropropylene monomer of about 54 to 88% by weight and the balance of polymerizable monomer being tetrafluoroethylene in the polymerization system under conditions whereby the hexafluoropropylene content of the copolymer produced in the later stage is in the range of 10 to 20% by weight and is at least 2% higher than it was at the end of the first stage.

2. The process according to claim 1, wherein the polymerization of tetrafluoroethylene and hexafluoropropylene is carried out at the first stage under the conditions so that the hexafluoropropylene content of the copolymer produced at the first stage becomes not more than 10% by weight.

3. The process according to claim 2, wherein the hexafluoropropylene content of the copolymer produced at the first stage is in the range of 2 to 10% by weight.

4. The process according to claim 3, wherein the polymerization reaction at the first stage is carried out in an amount of the hexafluoropropylene monomer of about 65 to 88% by weight in the polymerization system.

5. The process according to claim 1, wherein the time of the polymerization reaction at the first stage is about 1/10 of the whole polymerization reaction time or shorter.

6. In a process for producing a tetrafluoroethylene/hexafluoropropylene copolymer having a hexafluoropropylene content of 8 to 20% by weight by a process which comprises polymerizing tetrafluoroethylene and hexafluoropropylene in the presence of a polymerization initiator, the method of making a copolymer having improved stress-crack resistance which comprises polymerizing the monomers in one step with the amount of hexafluoropropylene monomer being about 54 to 88% by weight and the balance tetrafluoropropylene monomer until at least 15% by weight of the copolymer is produced and the hexafluoropropylene content of the copolymer is in the range of 2 to 10% by weight and in a second step continuing the polymerization reaction with about 88 to 94.7% by weight hexafluoropropylene monomer in the polymerization system under conditions whereby the hexafluoropropylene content of the copolymer produced in the second step is in the range of 10 to 20% by weight and at least 2% more than it was at the end of the first step.

* * * * *